D. H. HARMAN.
ANIMAL TRAP.
APPLICATION FILED JULY 17, 1909.
960,170.
Patented May 31, 1910.
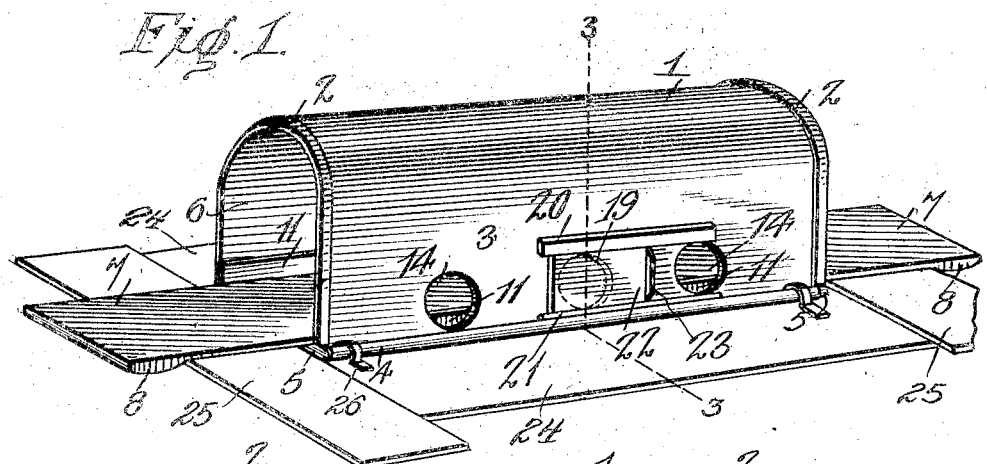
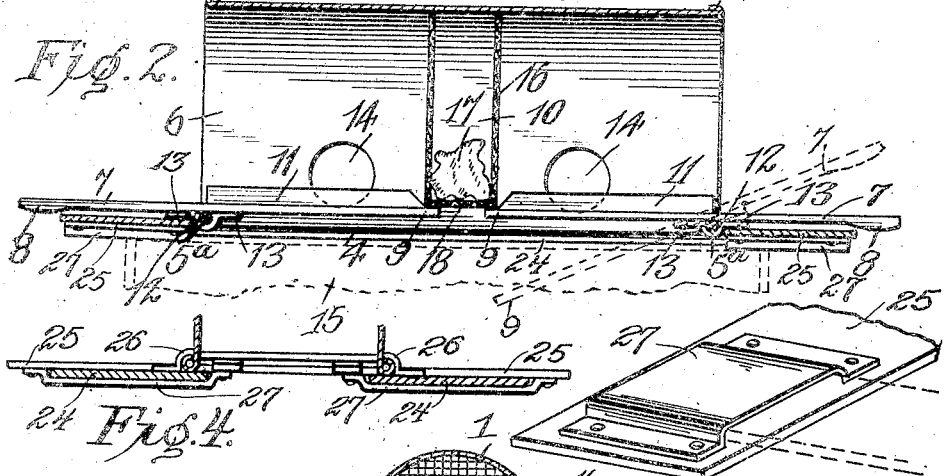
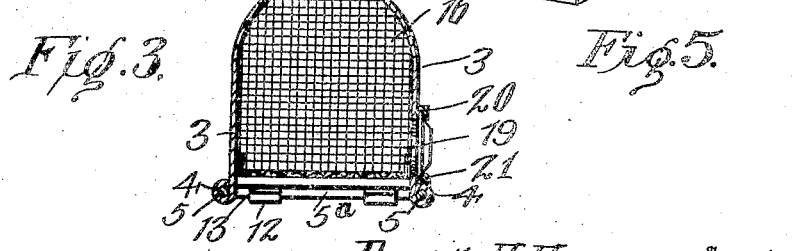
David H. Harman, Inventor
Witnesses
By E. E. Vrooman, his Attorney

UNITED STATES PATENT OFFICE.

DAVID H. HARMAN, OF SPOKANE, WASHINGTON.

ANIMAL-TRAP.

960,170.  Specification of Letters Patent.  Patented May 31, 1910.

Application filed July 17, 1909. Serial No. 508,151.

*To all whom it may concern:*

Be it known that I, DAVID H. HARMAN, a citizen of the United States, residing at Spokane, in the county of Spokane and State of Washington, have invented certain new and useful Improvements in Animal-Traps, of which the following is a specification, reference being had therein to the accompanying drawing.

This invention relates to animal traps, and has for its object the production of a trap, which is simple in construction, and which will automatically reset itself.

Another object of this invention is the production of a trap, which is simple in construction, efficient in operation, and consists of a comparatively small number of parts.

In the drawings: Figure 1 is a perspective view of the trap; Fig. 2 is a longitudinal section of the same; Fig. 3 is a transverse section taken on line 3—3 of Fig. 1. Fig. 4 is a transverse section of the trap showing the same positioned upon the supporting frame. Fig. 5 is a detail perspective of one end of the bracket supporting one end of the side of the adjustable supporting frame.

Referring to the drawings by numerals, 1 designates the body portion, which is substantially semicircular in cross section, and is, preferably, made from sheet metal, having its outer ends rolled or bent back upon themselves, as indicated at 2, thereby presenting a smooth outer edge to the end of the trap. The side portions 3 of the body terminate at their lower ends into rolled portions 4, in which is embedded or positioned a wire or rod 5, constituting a strengthening member. The rod or wire 5 extends around the entire lower edge of the body of the trap and across the open ends 6 thereof, thereby forming a support for the tilting doors 7, which doors are mounted thereon, or secured thereto.

The tilting doors 7 are provided upon their outer ends with enlarged portions 8, constituting weights for normally holding an inner end 9 in an operative position or in engagement with the bait receptacle 10, hereinafter described. The tilting doors 7 are provided between the side walls 3 of the body portion upon each side thereof with upwardly-extending bulged portions 11, which act as a guide for directing the inner end 9 into an operative position, and also tend to hold the same against lateral movement. The tilting doors 7 are mounted upon the portion 5ª of the strengthening member 5, which passes across the open end 6 of the trap, as previously stated, by means of a journal member 12, which straddles the strengthening member 5ª, and has its laterally-extending portions 13, fixedly secured to the tilting door 7. The flange 11 terminates short of the inner end 9 of the tilting door 7, thereby forming a flat outer end for engaging the body of the receptacle 10. The receptacle 10 limits the inward movement of the inner end 9 of the tilting door 7 thereby normally holding the same in a longitudinal plane. The body portion is adapted to be placed upon a receptacle containing water, so as when the animal enters the open end of the trap, or through said openings 14 of the walls 3, the weight of the animal will tilt the inner end 9 and cause the animal to fall within the receptacle 15, shown in dotted lines in Fig. 2.

From the foregoing description, it will be readily seen that by having a trap constructed in accordance with the present invention that the same will be, at all times, set and will catch any number of animals without being reset a great number of times as is the case with a number of traps now in common use.

Positioned intermediate the ends of the body 1, is a bait receptacle 10, as previously stated, and comprises, preferably, wire walls 16 in which is adapted to be positioned the bait 17, and the bottom 18 of the receptacle acts as a stop for the inner ends of the tilting doors 7 for limiting the inward movement of the same. Therefore, it will be obvious that the body will, at all times, be held out of reach of the animals coming into the trap, thereby preventing the necessity of refilling the trap with bait.

The body, as previously stated, is provided upon each side, near each end with apertures 14 for admitting light into the body 1. The body is also provided with an aperture 19, which is preferably, formed intermediate the ends of the trap and between the apertures 14, and said aperture 19 communicates with the bait receptacle 10 for allowing the bait to be readily placed within said receptacle. Upon the same side with the aperture 19 is an upper track portion 20 and a lower track portion 21, the upper track portion being formed of metal, preferably, L-shaped in cross section, and the lower track portion comprises a cylindrical member spaced apart from the side of the body, and fixedly secured by any suitable fastening means to the roller portion 4 of the side wall. Between the track portions 20 and 21 is positioned a sliding door 22, which normally closes the opening to the bait receptacle and said sliding door is provided with a laterally-extending flange 23, which acts as a handle for facilitating the sliding of the door 22 upon the tracks.

The trap 1 is positioned upon an adjustable supporting frame, which comprises side members 24 and end members 25. The side members 24 have secured to their upper surfaces clamp members 26, which members 26 overhang the rolled portions 4 of the body 1 of the trap. These clamp members firmly secure the trap or body upon the supporting frame and prevent the displacement of said body from the frame. The end members 25 are provided upon the under surface thereof with brackets 27 in which are adjustably mounted the ends of the side members 24 shown clearly in Fig. 5 of the drawing.

It will be obvious that when it is desired, the frame can be readily and quickly taken apart and folded to a convenient position by easily removing the end pieces 25 of the frame from the side pieces 24. Then the side pieces 24 can be removed from engagement with the roll portions 4 and the frame can be folded or placed in a compact position.

What I claim is:—

1. An animal trap of the class described comprising a substantially semi-circular body portion terminating at its lower edges into rolled portions, a wire passing through said rolled portions and crossing the open ends of said body, a tilting door hinged to said portions extending across said ends, and means adapted to limit the inward swing of said door.

2. An animal trap of the class described comprising a body substantially semi-circular in cross section, the sides of said body terminating upon the bottom into rolled portions, a strengthening member passing through said rolled portions and across the ends of said trap, the ends of said body folded upon the outer edge thereof for reinforcing the same and presenting a smooth edge therefor, and tilting doors secured to said strengthening member.

3. An animal trap of the class described comprising a body provided upon the lower edge of each side with a rolled portion, a strengthening member extending therethrough and provided with a portion extending across the end of said body, tilting doors, journals provided with laterally-extending portions, said journals straddling said strengthening member and having their laterally-extending portions secured to the under surface of said tilting doors for hingedly connecting the same to said strengthening member, and means carried by the body for limiting the inward swing of said door.

4. The combination with a supporter for a trap comprising a pair of side members, a pair of end members, brackets carried by the under surfaces of said end members, the ends of said side members adjustably mounted within said brackets, a trap supported upon said support and provided with a rolled portion upon the bottom thereof, and clamp members fixedly secured to the side members and straddling or engaging the rolled portions for holding the trap firmly upon the adjustable frame.

5. The combination with a support for a trap, comprising a pair of side members, a pair of end members slidably mounted upon said side members, a trap mounted upon said support, and means carried by said support and engaging said trap for holding the trap upon said support.

In testimony whereof I hereunto affix my signature in presence of two witnesses.

DAVID H. HARMAN.

Witnesses:
 FRANK E. WOODS,
 JACOB BLUME.